March 21, 1933.  L. P. WHITAKER  1,902,349
PROCESS OF MAKING HEAT EXCHANGERS
Filed Jan. 31, 1931  2 Sheets-Sheet 1
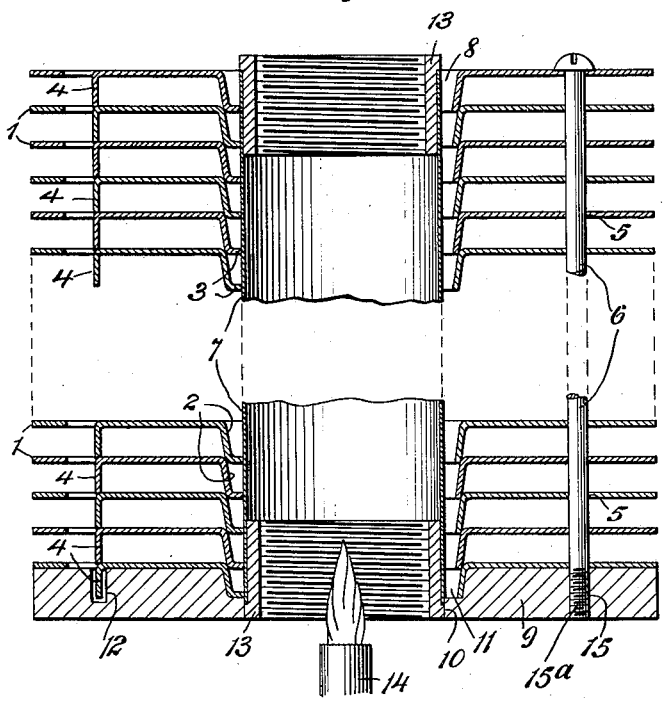
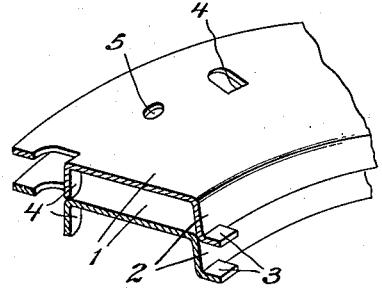
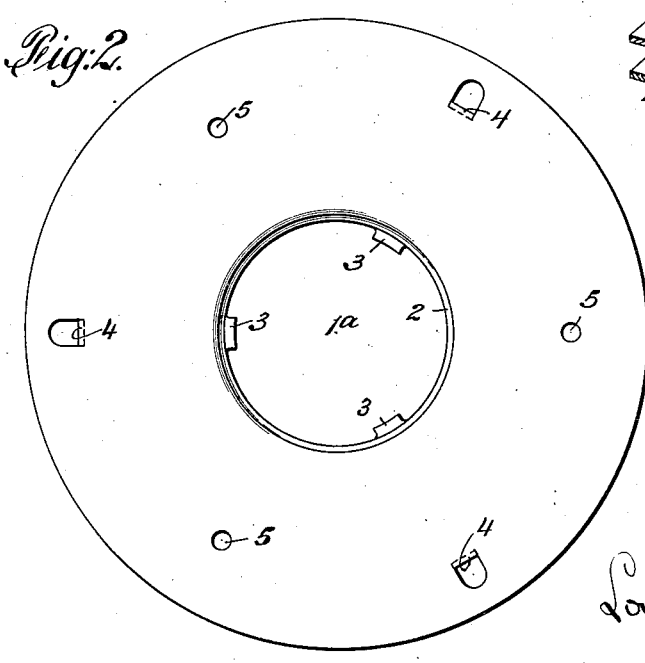
INVENTOR March 21, 1933.  L. P. WHITAKER  1,902,349

PROCESS OF MAKING HEAT EXCHANGERS

Filed Jan. 31, 1931   2 Sheets-Sheet 2

INVENTOR
Louis Prevost Whitaker

Patented Mar. 21, 1933

1,902,349

UNITED STATES PATENT OFFICE

LOUIS PREVOST WHITAKER, OF NEW YORK, N. Y., ASSIGNOR TO S. R. DRESSER MANUFACTURING COMPANY, OF BRADFORD, PENNSYLVANIA, A CORPORATION OF PENNSYLVANIA

PROCESS OF MAKING HEAT EXCHANGERS

Application filed January 31, 1931. Serial No. 512,577.

My invention consists in the novel features hereinafter described, reference being had to the accompanying drawings which illustrate the preferred manner in which my invention may be carried into effect, selected by me for purposes of illustration, and the said invention is fully disclosed in the following description and claims.

My invention relates to a process for the manufacture of heat exchangers adapted especially for the transmission of heat in heating or cooling systems. The heat exchanger produced as a result of said process is not claimed herein but is covered by a divisional application filed October 10, 1931 and given Serial No. 568,008.

Heat exchangers of this kind ordinarily comprise a plurality of fins or plates in spaced parallel relation and extending in all directions from a fluid conducting passage or conduit with which the fins are united. It has been proposed heretofore to form a heat exchanger of this kind by employing a plurality of apertured plates provided with spacing elements, usually integral with the plates, and in the form of a cylindrical flange coaxial with the central aperture therein, the flanges of said plates being placed upon a heavy supporting pipe which forms the conducting passage, and the plates and supporting pipe being united by galvanizing, soldering, brazing or welding the flanges of the plates to the supporting pipe. This construction presents a number of disadvantages, one of which is the difficulty in securing and maintaining a satisfactory union between the supporting pipe and the plates, to insure rapid conductivity of heat from the interior of the pipe to the fins, or vice versa, and the production of such heat exchangers of fin units is very expensive, particularly where the plate flanges are welded or brazed to the pipe. I am also aware of the fact that it has been proposed to assemble in a built up structure a plurality of apertured plates or fins with alternating spacing members between them, providing a removable internal core of less external diameter than the internal diameter of the longitudinal space formed within said apertured plates, and spacing members, casting a cylindrical body between said core and the spacing members in such manner that portions of the plates will be anchored or embedded in the casting, for the purpose of uniting the plates with the cast portion, which provides the fluid conducting passage of the unit and becomes the supporting member thereof.

According to my present invention in its preferred form I employ a plurality of apertured plates provided with spacing members coaxial with the apertures therein, and formed conveniently integrally with the plates, which are arranged in a built up structure, with the plates in spaced relation around a thin metal tube or cylinder is preferably formed of metal of high conducting capacity, with the spacing members of the plates spaced annularly from the interior tube and maintained in coaxial relation therewith, the spacing members being conveniently provided with inwardly extending separated lugs or projections engaging the interior tube at separated points, while the space between the tube and the spacing members of all of the plates of the series is in direct communication throughout the length of the unit. The assembled tube and plates are preferably clamped in assembled relation and supported in a vertical position upon a suitable support, which will form a closure for the lower end of the annular space between the interior tube and the spacing elements of the plates, and cast metal is poured into this annular space so as to rigidly and permanently unite the plates and also the inner tube, which forms the inner mold wall, while the outer mold wall is formed by the spacing members. Where the spacing members are provided with centering lugs to engage and center the inner tube, such lugs would be anchored or embedded in the cast metal. The built up structure is preferably heated before or during the cast-operation to facilitate the flow of the metal. I prefer to introduce a heating medium in the form of a heating fluid, gases of combustion or any other form of heating means within the inner tube of the built up structure, although the built up structure might be heated in other ways. I prefer to introduce the heating medium at the lower end of the inner tube and cause it to pass upwardly therethrough in a direction opposite to the flow of the casting metal and, during the casting operation as by locating a burner or burners below the lower end of the inner tube so as to facilitate the casting operation.

By forming the heat exchanger or fin heating unit in this manner, a comparatively thin body of cast metal may be formed which reinforces the light inner tube and unites it and the plates or fins into a substantially integral structure, which readily transmits heat from the interior of the inner tube to the fins, or vice versa. Suitable internally threaded collars are preferably inserted in the opposite ends of the thin inner tube, by pressing them into the same, or otherwise securing them thereto, either before or after the casting operation, but preferably before the cast metal is poured, which collars facilitate the connection of pipe fittings of usual character to the unit. A plain end plate, or plates, may be applied to the built up structure and secured in any desired manner thereto, or to the screw collars, to give a desired finish to the unit.

My invention also comprises the novel features of construction and combination of parts hereinafter fully described and particularly pointed out in the claims.

Referring to the accompanying drawings,

Fig. 1 is a sectional view, with the central portion omitted, and indicated by dotted lines, showing a plurality of plates or fins assembled upon an interior thin walled tubular member and supported in position for casting the annular connecting body between said tubular member and the spacing members of the plates.

Fig. 2 is a top plan view of one of said plates.

Fig. 3 is a perspective view, partly in section, of a portion of two of the plates in assembled relation.

Figure 4:
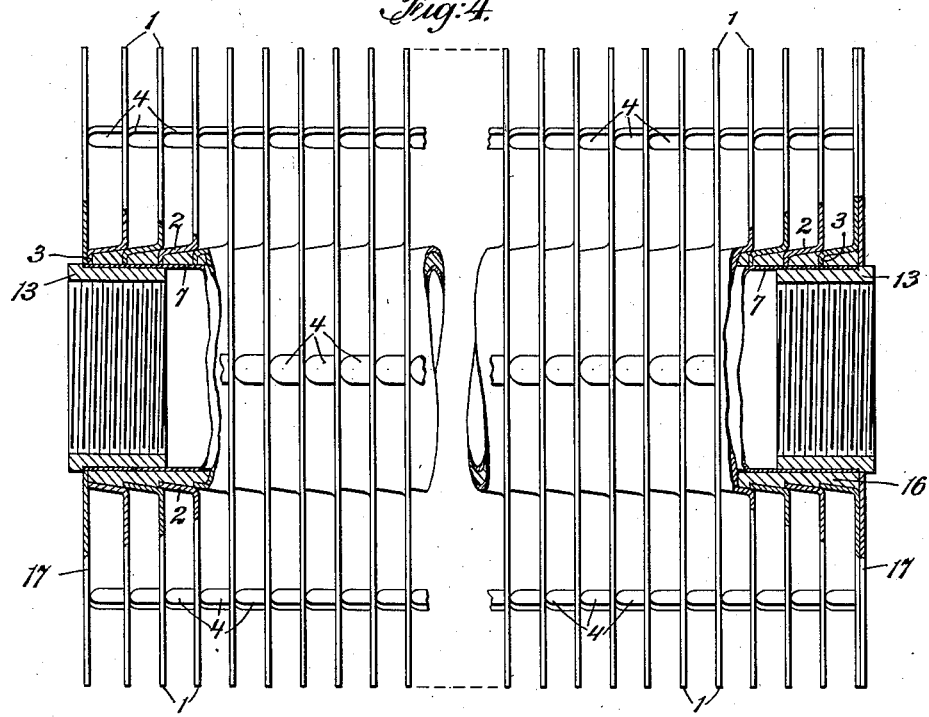
Fig. 4 is a side view, partly in section and partly broken away, of a completed heat exchanger or fin heating unit.

In carrying out my invention, I form a plurality of plates or fins, indicated at 1, which are preferably pressed or stamped from sheet metal, such as copper, aluminum, iron or steel, for example. The plates may be circular or rectangular or of any other desired form. Each plate is provided with an aperture, indicated at 1a, although it will be understood that each plate may have more than one aperture if the plates are to be provided with a plurality of tubular passages. As shown, the aperture, 1a, is centrally located, and the plate, 1, is provided with an annular substantially cylindrical flange, 2, surrounding the aperture, 1a, and coaxial therewith. These annular flanges form integral spacing members for spacing the plates longitudinally with respect to the tubular passage, and I prefer to provide said spacing members at their free edges with inwardly extending separated lugs, 3, 3, three of which are indicated in the drawings, see Fig. 2, and which serve the function of centering the plates with respect to the inner tube. These lugs, however, may be omitted and the tube may be centered in other ways. Each plate is also preferably provided with auxiliary spacing elements, indicated at 4, which may be conveniently formed by striking the up portions of the metal of the plate at right angles thereto of a proper length to serve as the spacing elements, in the manner indicated in the drawings. The plates, 1, are also provided, preferably with a plurality of bolt holes, 5, the bolt holes of the several plates being in alignment when the plates are assembled, so that the plates may be temporarily united by suitable bolts, one of which is indicated at 6 in Fig. 1, for example. 7 represents a tubular member of cylindrical or other preferred form corresponding with the form of the apertures in the plates and being sufficiently smaller in cross section than said apertures, so as to form a space, indicated at 8, between the inner face of the spacing members, 2, of the assembled plates, and the outer surface of the tube.

I find it convenient to assemble the desired number of plates to form a unit of desired length, in the manner illustrated in Fig. 1, upon a removable base plate, indicated at 9, which is provided with a central aperture, 10, conforming to the exterior surface of the tube, 7, and having an annular recess, 11, to accommodate the spacing member, 2, of the lowermost plate of the series, the bottom of said recess forming in effect the bottom of the mold of which the thin tubular member, 7, is the inner mold wall, and the spacing elements of the plates constitute the outer mold wall. The spacing elements, 2, when formed integrally with the plates may be made of slightly smaller diameter at the ends remote from the body of the plate, so as to enter to a greater or less extent, as desired, the upper portion of the next adjacent spacing member, thus enabling the plates to be nested to a certain exent. This arrangement will assist in preventing any leakage of the molten metal, but it is not essential, and the spacing members, 2, may be of uniform diameter throughout and have their lower ends abut directly against the main body of the adjacent plate, so as to bring the spacing members into direct alignment, if desired. The bottom supporting plate, 9, will also be provided with recesses or pockets, 12, to accommodate the auxiliary spacing elements, 4, of the lowest plate of the series, if desired, and will also be provided with means, as threaded apertures, 15, one of which is shown in Fig. 1, for engaging threaded portions, 15a, of the bolts, 6, which clamp the plates in assembled relation. I prefer to provide the thin tubular member, 7, at each end with an internally threaded collar indicated at 13, which may be and preferably is pressed therein or otherwise connected therewith. It will be understood that the built up structure illustrated in Fig. 1 may be assembled in quantity and may be readily transported from the place of assembly to the place where the casting operation is to be performed.

The central tubular member forming the inner mold wall is held in centered position in the apertures of the plates by the inwardly extending lugs, 3, if they are provided. It will be understood, however, that the plates alone may be built up, secured together in the manner described, and transported to the place where the casting operation is to be performed, and that the central tubular member, 7, may be inserted just before the casting operation. It will also be understood that the tubular member may be held in centered relation to the plate apertures by the aperture, 10, at the bottom of the supporting plate, 9, and by any suitable means engaging the upper end of the tubular member, and held in fixed relation with the plates, if it is desired to omit the lugs, 3.

I prefer to heat the built up structure preparatory to or during the casting operation. Obviously this can be done by passing the built up structures through a heating chamber on a suitable conveyor, on their way to the point of casting. I find it convenient, however, to provide a heating burner, 14, or burners, below the lower end of the tubular member, which presents an uninterrupted passage for a heating medium such as the products of combustion from said burner, the heating medium passing from the bottom upwardly, while the cast metal will flow from the upper part of the built up structure downwardly, thus preventing the casting metal from cooling too rapidly, and insuring the formation of substantially uniform castings. The cast metal, which is preferably a metal or alloy having a lower melting point than the metal forming the inner tubular member and the spacing elements is poured into the annular space between the inner and outer mold walls, and upon cooling forms a substantially cylindrical cast metal body, which is firmly united to both the inner tubular member, 7, and the spacing members of the plates, the centering lugs, 3, of the plates, if they are employed, being firmly anchored and embedded in the body of the cast metal. I prefer, as before stated, to apply the heating medium to the interior of the tubular member, 7, during the pouring of the cast metal, to facilitate the casting operation, and in this way a comparatively thin cast metal body or wall may be formed, it being only necessary that this cast metal wall as reinforced by the inner tubular member, 7, and the spacing members, shall have sufficient strength to support the unit. I am thus able to obtain the necessary strength for the tubular member of the unit, with a comparatively thin body of cast metal, rigidly uniting the inner tube and the plates and their spacing elements into an integral structure. In this way the unit can not only be made lighter than would be the case where the thick cast wall is formed which alone must provide practically all the strength required for the tubular member of the unit, but the thinning of the cast wall greatly facilitates the exchange of heat between the tubular member and the plates and fins. Furthermore, the inner tube element, which is preferably made of copper or other metal having high heat conducting properties, can be made very thin, comparatively, as it is not required to furnish the strength for the tubular member, this also increasing the conductivity of the unit and keeping down the cost of the same.

The bond between the cast metal and the tubular member, plates and spacing members, will depend upon the character of the metals employed. For example, the bond may be formed by the shrinkage of the metal in cooling, in which case the surfaces will be held in mechanical contact in a manner similar to mechanical clamping. On the other hand, there may be a direct adhesion between the cast metal and the contacting portions of the tube, and plates, analogous to brazing or soldering, and in some instances, as where the cast metal is of the same or nearly the same type, as the metal from which the plates are made, and projecting portions of the plates or the spacing elements thereof, project into the cast metal, there may even be fusion, that is to say union analogous to welding between the cast metal and portions of the plates or spacing members. In such cases, however, it may be desirable or necessary to support the inner and outer mold walls, as by embedding them in sand, for example, or otherwise to prevent them from collapsing.

It will be understood that while I have shown a unit in which the plates are provided each with a single tubular conducting passage, units may be formed in like manner with two or more tubular passages, if desired. I prefer, however, to form them as shown, as it enables the use of plates of comparatively small dimensions, which permits them to be stamped, pressed or formed from scrap plate or other waste material with corresponding economy of production.

For the cast metal body I may employ aluminum or an alloy of the same or any other desired fusible metal having the necessary characteristics to enable it to be poured between the tube, and the exterior mold wall formed by the plates and their spacing elements, and uniting the tube, cast metal body and plates and spacing elements, into a substantially integral body. Fig. 4 shows one of the completed units, the tube member being shown provided at each end with the internally threaded collars, 13, for the attachment of pipe connections, but it is to be understood that the connecting pipes may be attached in any other desired manner. The cast metal body, which units the tube member and plate and spacing members therewith, to form the integral structure, is indicated at 16, the inwardly projecting portions, 3, of the spacing elements being shown embedded in the cast metal body. In some instances, if desired, plain apertured finishing plates or end plates, indicated at 17, may be provided at each end of the unit and secured to the unitary structure, by being pressed over projecting portions of the tube, 7, or of the collars, 13, or they may be held in position in any other desired manner.

Figure 5:
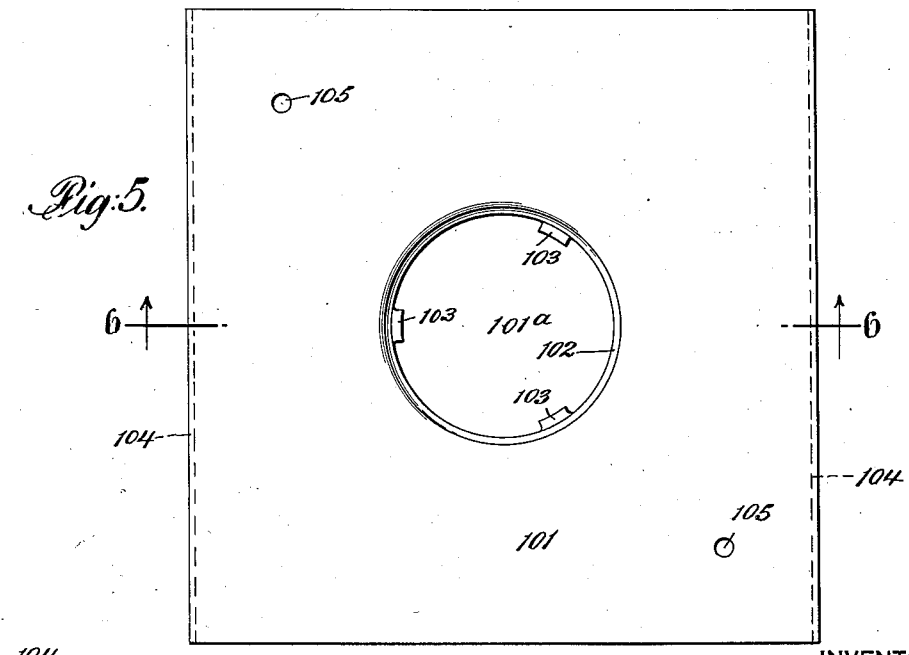
Fig. 5 is a top plan view of a modified form of plate.
Figure 6:
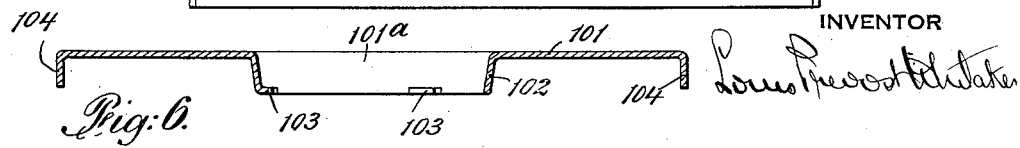
Fig. 6 represents a section on the line 6—6 of Fig. 5.

In Figs. 5 and 6, in which the corresponding parts are given the same reference numerals with the addition of 100, I have illustrated a modified form of plate, 101, which in this instance is rectangular in form, provided with a central aperture, 101a, and annular spacing element, 102, surrounding the same, two parallel edges of each plate being bent angularly on the same side of the plate as the spacing element, 102, to form lateral flanges, 104, constituting the auxiliary spacing elements, and the marginal edges of the spacing elements, 102, are also shown as provided with the inwardly extending centering projections, 103, to engage and center the tube element in the built up structure. The plate 101, is also shown provided with two oppositely disposed bolt holes, 105, to receive the clamping bolts for clamping the plates in assembled relation in the manner indicated in Fig. 1.

While I have shown a heating burner for heating the interior of the tube element, any other suitable heating means may be employed.

What I claim and desire to secure by Letters Patent is:

1. The herein described process of manufacturing a heat exchanger which consists in forming an exterior mold wall by assembling a plurality of apertured metal plate elements, spaced by apertured metal spacing elements, said plate and spacing elements having their apertures in coaxial alignment, supporting a metal tube element within said exterior mold wall and spaced therefrom to form an interior mold wall, and casting a body of metal between said mold walls, and united to said tube and said plate elements.

2. The herein described process of manufacturing a heat exchanger which consists in forming an exterior mold wall by assembling a plurality of apertured metal plate elements, spaced by apertured metal spacing elements, said plate and spacing elements having their apertures in coaxial alignment, and providing some at least of said elements with separated tube engaging portions projecting inwardly from said exterior mold wall, supporting a metal tube element within said tube engaging portions and thereby spaced from said exterior mold wall, to form an interior mold wall, and casting a substantially cylindrical body of metal between said mold walls and around said tube engaging portions united to said tube, plates and spacing elements, and embedded said projecting tube engaging portions therein.

3. The herein described process of manufacturing a heat exchanger which consists in forming an exterior mold wall by assembling a plurality of apertured metal plate elements, spaced by apertured metal spacing elements, said plate and spacing elements having their apertures in coaxial alignment, supporting a metal tube element within said exterior mold wall and spaced therefrom to form an interior mold wall, heating said mold walls, and casting a body of metal between said inner and outer mold walls, while in heated condition, to unite the said tube, plate and spacing members with said cast metal body.

4. The herein described process of manufacturing a heat exchanger which consists in forming an exterior mold wall by assembling a plurality of apertured metal plate elements, spaced by apertured metal spacing elements, said plate and spacing elements having their apertures in coaxial alignment, supporting a metal tube element within said exterior mold wall and spaced therefrom to form an interior mold wall, pouring molten metal between said mold walls, and applying heat to the interior of said tube element to form a body of cast metal between said mold walls united to said tube, plate and spacing elements.

5. The herein described process of manufacturing a heat exchanger which consists in forming an exterior mold wall by assembling a plurality of apertured metal plate elements, spaced by apertured metal spacing elements, said plate and spacing elements having their apertures in coaxial alignment, supporting a metal tube element within said exterior mold wall and spaced therefrom to form an interior mold wall, pouring molten metal between said mold walls at one end thereof, and introducing a heating medium into the interior of said tube element at the opposite end thereof and discharging it from the tube at the end adjacent to which the molten metal is poured into the mold, and forming a body of cast metal united to said tube, plate and spacing elements.

In testimony whereof I affix my signature.

LOUIS PREVOST WHITAKER.